Nov. 29, 1955 A. H. J. N. VAN DIJKUM ET AL 2,725,469
RADIO RECEIVING SET FOR THE RECEPTION OF TWO FREQUENCY RANGES
Filed Sept. 10, 1952
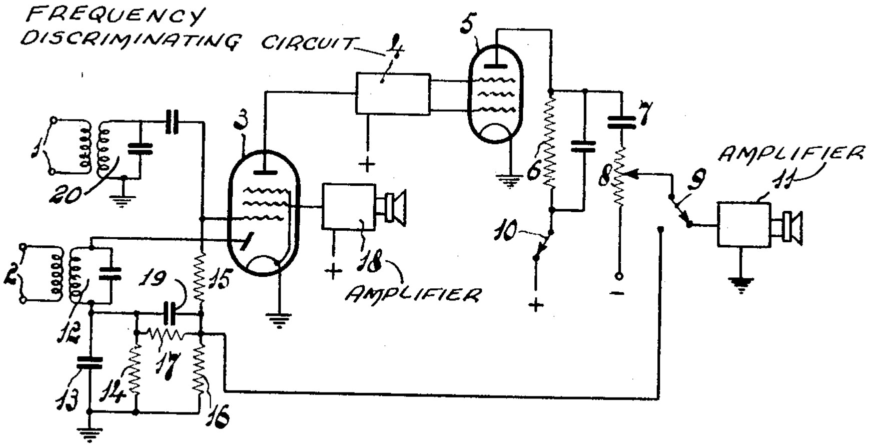
INVENTORS
ADELBERTUS HERMANUS JACOBUS NIEVEEN VAN DIJKUM
HENRI HERMAN VAN ABBE
BY Fred M Vogel
AGENT United States Patent Office 2,725,469

Patented Nov. 29, 1955

2,725,469

RADIO RECEIVING SET FOR THE RECEPTION OF TWO FREQUENCY RANGES

Adelbertus Hermanus Jacobus Nieveen van Dijkum and Henri Herman van Abbe, Eindhoven, Netherlands, assignors to Hartford National Bank and Trust Company, Hartford, Conn., as trustee Application September 10, 1952, Serial No. 308,872

Claims priority, application Netherlands September 19, 1951

6 Claims. (Cl. 250—20)

This invention relates to radio receiving sets for the reception of two frequency ranges. With such sets endeavours will generally be made to use the same amplifier valves for the transmission of the signals associated with the various frequency ranges. However, this often gives rise to excessive complications of the circuit-arrangement so that it is more advantageous to separate, at least in part, the channels for the transmission of the oscillations. This is particularly the case, when the oscillations of one frequency range are frequency-modulated or phase-modulated and those of the other frequency range are amplitude-modulated, provision being made of an amplitude detector for the detection of the high-frequency oscillations of one frequency range and of a frequency detector for the detection of oscillations of the other frequency range so that the detected oscillations occur in different circuits. In addition, it will often be necessary to use a higher gain, and hence more tubes, in the channel for the signals of one frequency range than in the channel for the transmission of the oscillations of the other frequency range.

If the channels for the transmission of the low-frequency oscillations obtained on detection are separated at least in part, and more particularly of the low-frequency oscillations of the two regions are obtained by different detectors, difficulty arises if the amplitude of the low-frequency oscillations is required to be controlled by hand. Obviously, it is possible to provide two separated control members but this is undesirable from the view-point of simplicity of control. The invention provides a simple circuit-arrangement in which a favourable volume control by hand can be obtained for both frequency ranges with the use of a single potentiometer in conjunction with a switch means.

The invention consists in that with a radio-receiving set for the reception of frequencies in two frequency ranges, in which the channels for the transmission of the low-frequency oscillations obtained on detection are separated at least in part and for the volume control on reception in either of the frequency ranges provision is made of a potentiometer across which are set up the low frequency oscillations which are required to be amplified or reproduced on reception in the said frequency range and which also serves for the low-frequency volume control on reception of frequencies in the second frequency range, which purpose is served by a switch by means of which a part of the potentiometer resistor that is variable by means of a sliding contact, on reception in the second frequency range, is included in the channel for the transmission of the low-frequency oscillations.

The said variable part of the potentiometer resistor is preferably connected in parallel with a resistor in the circuit of a detector for the oscillations of the second region.

The invention is particularly applicable to sets which are adapted both for the reception of frequency-modulated oscillations and for that of amplitude-modulated oscillations. In this case it is favourable that on reception of a frequency modulated oscillation the total potentiometer resistor is included in the output circuit of a low-frequency amplifier valve, or of the detector, whereas on reception of amplitude-modulated oscillations the said variable part of the resistor is connected in parallel with a resistor which is interconnected between grid and cathode of a low-frequency amplifier valve and also forms part of the detector circuit.

The required switch is preferably coupled with the switch means which serves for the change-over from one frequency zone to the other.

In order that the invention may be clearly understood and readily carried into effect, it will now be described with reference to the accompanying drawing, which shows a circuit-arrangement of a device by means of which both frequency-modulated and amplitude-modulated oscillations can be received. The drawing shows only those parts of the circuit-arrangement which are essential for the invention.

The terminals to which a frequency-modulated intermediate frequency voltage supplied from a frequency transformer (not shown) is fed are designated 1. The oscillations are transmitted inductively to a circuit 20 tuned to the central intermediate frequency and fed via a capacitor to the first control grid of a valve 3 which is designed as a diode-pentode. The latter acts as an intermediate frequency amplifier and its anode is connected to a device 4 by means of which are derived two voltages the phase difference of which depends on the frequency. As a rule, this device will comprise two coupled circuits from which the said voltages are abstracted.

The detector is of the type with which the low-frequency voltage obtained by detection appears directly in the anode circuit of a valve 5 comprising several grids. The said phase-displaced voltages are fed to two control grids of this valve. The low-frequency voltages are set up across a resistor 6 which is included in the anode circuit of the valve 5 and is shunted by a capacitor whose impedance is low for the intermediate-frequency oscillations. The top end of the resistor 6 is connected via capacitor 7 to a potentiometer resistor 8 the bottom end of which is connected to a source of negative voltage. The sliding contact of the potentiometer 8 leads via a switch 9 to a low-frequency amplifier 11, to the output circuit of which the load, for example a loudspeaker, is connected. The switch 9 is mechanically coupled with a switch 10 which, in the position shown, connects the bottom end of the anode-resistor 6 to the positive pole of the supply source. At the position shown of the switches 9 and 10 the set is adapted for the reception of frequency-modulated oscillations.

On reception of amplitude-modulated oscillations the amplitude modulated intermediate frequency oscillations are set up across the terminals 2. They are supplied inductively to a circuit 12 tuned to the intermediate frequency carrier-wave, which circuit is earthed via a resistor 14 and is connected to the diode-anode arranged in the valve 3. The cathode of the valve 3 is also connected to earth potential. Across the resistor 14 there are consequently set up the detected oscillations. The capacitor 13 constitutes a high impedance for the low-frequency oscillations and a low impedance for the intermediate frequency oscillations.

The valve 3 also acts as a low-frequency amplifier for the signal obtained by detection of the amplitude-modulated oscillations. For this purpose, the first control grid is separated from earth by the series combination of two resistors 15 and 16 to the common point of which are fed, via a resistor 17, the low-frequency oscillations set up across the resistor 14. The amplified low-frequency oscillations are abstracted from the screen grid circuit and, in some cases after further amplification in the device 18, are fed to the reproducing device. Although the devices 11 and 18 are shown separated, the amplifier valves arranged in them may be common, at least in part.

Changing over for reception of amplitude-modulated oscillations results in the switches 9 and 10 being operated due to the fact that they are mechanically coupled with the wave length switch. This has the effect of rendering the valve 5 inactive and of connecting the part of the resistor 8 which is included between the sliding contact and the negative pole of the source of auxiliary voltage in parallel with the resistor 16 for the low-frequency signals. Displacement of the sliding contact on the potentiometer resistor 8 consequently permits of altering the amplitude of the low-frequency oscillations across the first control grid of the valve 3 on reception of amplitude-modulated oscillations, since in this case the resistor 16, across which the low-frequency oscillations are set up, is short-circuited to a greater or less extent. A resistor 17 which is shunted by a capacitor 19 prevents the resistor 14 from being short-circuited at the lowest position of the sliding contact. In this case, the negative bias voltage of the first control grid of the valve 3 is supplied via the bottom part of the potentiometer 8. The resistor 15 has the function of avoiding excessive damping of the circuit 12.

The network 17/19 brings about a tone-correction which partly compensates for the weakening effect of the capacitor 13 on the higher tones. Displacement of the contact of the potentiometer 8 has the effect, on reception of amplitude-modulated oscillations, of also altering the negative bias voltage of the grid of valve 3. However, this change acts in a sense favourable for the desired control.

What we claim is:

1. In a receiver for selectively receiving signals in two frequency ranges, apparatus comprising first means for detecting the signals in the first of said two ranges, second means for detecting the signals in the second of said two ranges, a potentiometer comprising a resistor element and a movable tap thereon, means for coupling said potentiometer to the output of said first detecting means for controlling the volume thereof only during the reception of the signals in the first of said two ranges, and switching means for coupling through said movable tap a portion of said resistor element to the output of said second detecting means for controlling the volume thereof only during the reception of the signals in the second of said two ranges.

2. Apparatus, as set forth in claim 1, wherein said second detecting means includes a first resistor across which detected signals are produced and wherein said portion of said resistor element is connected in parallel with said first resistor.

3. Apparatus, as set forth in claim 2, wherein said second detecting means further includes a second resistor, said portion of said resistor element being connected in parallel with said second resistor.

4. In a receiver for selectively receiving frequency-modulated signals in one range and amplitude-modulated signals in another range, apparatus comprising first means for detecting the signals in said one range, second means including a resistor for detecting the signals in said another range, a potentiometer comprising a resistor element and a movable tap thereon, means for coupling said potentiometer to the output of said first detecting means for controlling the volume thereof only during the reception of the signals in said one range, an amplifying stage including an electron discharge device having a control grid and a cathode, said resistor being connected between said control grid and said cathode, and switching means for coupling through said movable tap a portion of said resistor element in parallel with said resistor for controlling the volume of the detected signals in said second detecting means during the reception of the signals in said another range.

5. Apparatus, as set forth in claim 4, further including means for applying said frequency-modulated signals to the input of said amplifying stage, said applying means comprising said resistor having a second tap thereon and a circuit tuned to a predetermined frequency in said one range, the detected signals from said second detecting means being applied through said second tap to the input of said amplifying stage, and means for coupling the output of said amplifying stage to the input of said first detecting means.

6. Apparatus, as set forth in claim 4, wherein said first detecting means includes an electron discharge device having a plurality of grids across which the detected signals of said first range are produced and wherein said second detecting means includes a diode detector for detecting the amplitude-modulated signals.

References Cited in the file of this patent

UNITED STATES PATENTS

| | | |
|---|---|---|
| 2,408,644 | Huff | Oct. 1, 1946 |

FOREIGN PATENTS

| | | |
|---|---|---|
| 903,551 | France | Jan. 22, 1945 |
| 661,553 | Great Britain | Nov. 21, 1951 |